United States Patent Office 3,421,848
Patented Jan. 14, 1969

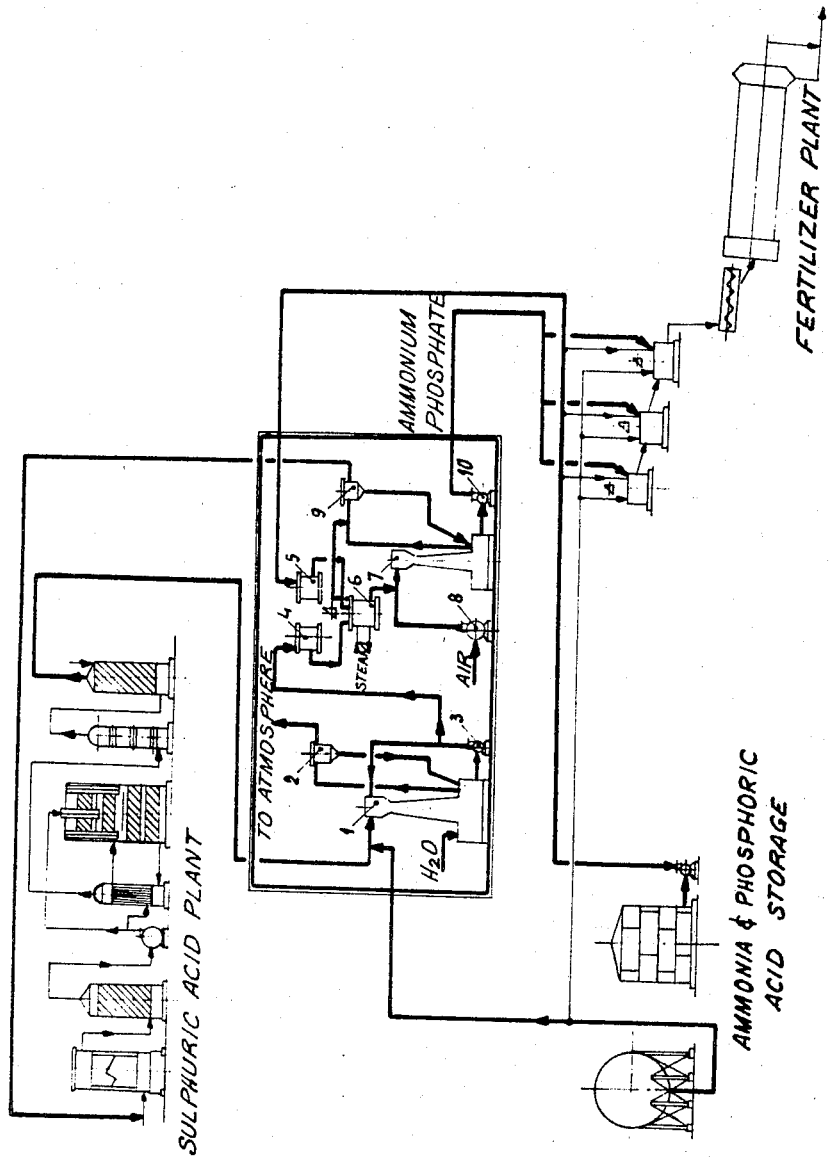

3,421,848
PROCESS FOR THE ADVANTAGEOUS UTILIZATION OF $SO_2$ AND $NH_3$ FROM THE PRODUCTION OF NITROGEN AND PHOSPHATIC FERTILIZERS
Nicolae Popovici, 74 Strada Popa Savu; Petre Potop, 22 Strada Avram Iancu; and Liviu Brandus, 19B Strada Bujoreni; all of Bucharest, Rumania
Filed Apr. 14, 1967, Ser. No. 631,043
Claims priority, application Rumania, Apr. 16, 1966, 51,316
U.S. Cl. 23—107      7 Claims
Int. Cl. C01b 25/28

ABSTRACT OF THE DISCLOSURE

A process of utilizing residual gaseous components of sulphuric acid production and ammonium phosphate production employed in a nitrogen and phosphatic fertilizer plant by absorbing $SO_2$ from the residual gases in ammonia solutions, the desorption of $SO_2$ from the ammonium sulfite-bisulfite which is obtained with an excess of phosphoric acid. Gases concentrated with $SO_2$ are obtained which are introduced in the existent sulfuric acid production process. An acid solution of ammonium phosphate free of aluminum and iron phosphate precipitates is also obtained and used for recovering ammonium from the installation producing ammonium phosphates.

Drawing

The sole figure is a flow diagram of the process of the invention.

Detailed description

The present invention relates to processes for the advantageous utilization of residual gases containing $SO_2$ and $NH_3$ obtained during the production of nitrogenous and phosphatic fertilizers.

Processes are known for obtaining nitrogenous and phosphatic fertilizers by the use of conventional plants for producing sulfuric acid, phosphoric acid, ammonia, and ammonium phosphates. The gases obtained from such plants contain small quantities of $SO_2$ and $NH_3$ which are recovered according to known methods. These gases are, namely, those containing sulfur dioxide which are eliminated from plants producing sulfuric acid by washing with ammonia solutions and residual gases containing ammonia resulting from the production of ammonium phosphate by washing with phosphoric acid solutions.

By absorbing gases containing small quantities of $SO_2$ and $SO_3$ in ammonia solutions, ammonium sulfite-bisulfite solutions are obtained from which, by treating with a slight excess of phosphoric acid, gases concentrated in $SO_2$ are recovered, these gases being introduced into the process for producing sulfuric acid. A solution of ammonium phosphates is also recovered with an abundant precipitation of aluminum and iron phosphates which are purified, concentrated, and crystallized. By washing the gases containing ammonia with phosphoric acid solutions, diluted ammonium phosphate solutions are obtained which are introduced into the cycle of ammonium phosphate production.

The disadvantages of the known processes for $SO_2$ and $NH_3$ recovery consist in the fact that for recovering the same, separate installations are used for obtaining, finally, the same product, namely, ammonium phosphate.

The present invention removes these disadvantages by treating simultaneously and efficiently the residual gases which contain $SO_2$ and $NH_3$. More particularly, for providing solutions which may be used for absorbing residual ammonia gases from the ammonium phosphate production process and which may be then introduced into existent installations for producing these phosphates, the desorption of $SO_2$ from the ammonium sulfite-bisulfite solution obtained by absorbing $SO_2$ in ammonia from the residual sulfurous gases is carried out by treating, with an excess of phosphoric acid solution, this phosphoric acid excess corresponding to a $NH_3:P_2O_5$ ratio by weight of a maximum of 0.226 for obtaining a complete desorption of $SO_2$ as well for preventing the precipitation of aluminum and iron phosphates using the existent facilities of the nitrogen and phosphatic fertilizer production plant. Concentrated gases in $SO_2$ resulting through desorption are introduced into the existent installation of sulphuric acid of the phosphatic and nitrogen fertilizer plant.

The drawing illustrates, by a flow diagram, an example of the application of the process according to the invention.

Residual gases containing 0.2% $SO_2$ and 0.3% $SO_3$ evacuated from the sulfuric acid plant are absorbed in an absorption column 1 in uniflow with ammonia taken from the ammonia production installation and with an ammonium sulfite-bisulfite solution recycled by pumps 3 obtaining thus an ammonium sulfite-bisulfite solution containing 400 g. $SO_2/l.$ and 150 g. $NH_3/l.$ having a density of 1.26 and obtaining also purified gases with a content of 0.006–0.008% $SO_2$ which may be evacuated to atmosphere after passing the mist separator 2. The ammonium sulfite-bisulfite solution of unit 4 is mixed in the mixing vessel 6 with a phosphoric acid solution coming from the tank 5, its required concentration being conventionally obtained at a plant where phosphoric acid is prepared from sulfuric acid and phosphate rock, in such a way as to provide a $NH_3:P_2O_5$ ratio by weight of a maximum of 0.226 for producing the complete elimination of $SO_2$ and for preventing the precipitation of aluminum and iron phosphates. At the same time, the solution mixture is heated to 80–95° C. From the desorption column 7, by means of air from a blower 8, gases with about 18% $SO_2$ and an acid solution of monoammonium phosphate containing 0.5 g. $SO_2/l.$, 510 g. $P_2O_5/l.$, and 55.5 g. $NH_3/l.$ are obtained. The gases with concentrated $SO_2$ pass through the mist separator 9 and then into the gas circuit of the sulfuric acid plant. The acid solution of ammonium phosphate is taken by the pump 10 and is used in the installation for $NH_3$ absorption from the residual ammonia gases, substituting thus the commonly used phosphoric acid. The obtained solution still having its acid characteristic is transferred into the installation for obtaining ammonium phosphate and is transformed into the end product.

The process according to the present invention has the following advantages:

It provides for the recovery of $SO_2$ from the residual gases in an advantageous way as sulfuric acid, the gases obtained by desorption being not contaminated with dust and having a high concentration in $SO_2$;

It eliminates the treatment operations of the products obtained by the recovery of $SO_2$ and thus separate installations are not required;

It provides for the recovery of $NH_3$ from the residual gases from the phosphoric acid-ammonium reaction and from ammonium phosphate drying by washing with acid solutions of ammonium phosphate obtained after desorption of sulfur dioxide;

A part of the phosphoric acid and ammonia required for obtaining the fertilizers by passing through the circuit for recovering $SO_2$ provides an advantageous utilization of ammonium entering again into the production cycle of ammonium phosphate completing thus the raw material balance of the plant;

It provides for the prevention of the noxious action of $SO_2$ in the productive area of the fertilizer plant, eliminating thus the corrosive effects on the installation and the continuation of the gases used for the synthesis of nitrogen products.

There will now be obvious to those skilled in the art many modifications and variations of the apparatus and method described above. The modifications and variations will not, however, depart from the scope of the invention if defined by the following claims.

What is claimed is:

1. A process for the utilization of sulphur dioxide and ammonia from residual gases obtained during the production of sulphuric acid and ammonium phosphate for the production of nitrogenous and phosphatic fertilizers, said process comprising the steps of absorbing $SO_2$ and ammonia in an ammonium sulphite-bisulphite solution, and desorbing the $SO_2$ from said ammonium sulphite-bisulphite solution by treating the same with an excess of phosphoric acid solution at 80–95° C. to obtain ammonium phosphate which is employed in the production of said fertilizers.

2. A process as claimed in claim 1, wherein the phosphoric acid has a maximum $NH_3:P_2O_5$ ratio by weight of 0.226.

3. A process as claimed in claim 2, wherein the ammonium sulphite-bisulphite solution has a density of about 1.26.

4. A process as claimed in claim 3, wherein the residual gases of sulphuric acid production include $SO_2$ and $SO_3$.

5. A process as claimed in claim 4, wherein the residual gases of sulphuric acid production include about 0.2% $SO_2$ and 0.3% $SO_3$.

6. A process as claimed in claim 5, wherein the ammonium phosphate is obtained as an acid solution of monoammonium phosphate containing $SO_2$, $P_2O_5$ and $NH_3$ in a ratio by weight of about 1.5:510:55.5.

7. A process as claimed in claim 6 comprising using the acid solution to recover ammonia from the production of ammonium phosphate.

No references cited.

EARL C. THOMAS, *Primary Examiner.*

L. A. MARSH, *Assistant Examiner.*

U.S. Cl. X.R.

23—178